United States Patent
Dekel et al.

(10) Patent No.: US 9,756,062 B2
(45) Date of Patent: Sep. 5, 2017

(54) COLLABORATIVE INFRASTRUCTURE SUPPORTING CYBER-SECURITY ANALYTICS IN INDUSTRIAL NETWORKS

(71) Applicant: General Electric Company, Schenectady, NY (US)

(72) Inventors: Shai Dekel, Ramat-Hasharon (IL); Lior Ateret, Herzliya (IL); Evgeny Bogokovsky, Herzliya (IL)

(73) Assignee: General Electric Company, Schenectady, NY (US)

(*) Notice: Subject to any disclaimer, the term of this patent is extended or adjusted under 35 U.S.C. 154(b) by 258 days.

(21) Appl. No.: 14/470,793

(22) Filed: Aug. 27, 2014

(65) Prior Publication Data
US 2016/0065603 A1    Mar. 3, 2016

(51) Int. Cl.
*H04L 29/06* (2006.01)
*G06F 21/55* (2013.01)

(52) U.S. Cl.
CPC ........ *H04L 63/1425* (2013.01); *G06F 21/554* (2013.01); *H04L 63/14* (2013.01)

(58) Field of Classification Search
CPC . H04L 63/14; H04L 63/1408; H04L 63/1416; H04L 63/1425; H04L 63/20
See application file for complete search history.

(56) References Cited

U.S. PATENT DOCUMENTS

| | | | |
|---|---|---|---|
| 8,533,818 B1 * | 9/2013 | Ketterhagen | G06F 21/567 726/22 |
| 2005/0132225 A1 | 6/2005 | Gearhart | |
| 2012/0011077 A1 | 1/2012 | Bhagat | |
| 2012/0096549 A1 | 4/2012 | Amini et al. | |
| 2012/0151589 A1 | 6/2012 | Hershey et al. | |
| 2012/0232679 A1 | 9/2012 | Abercrombie et al. | |

(Continued)

FOREIGN PATENT DOCUMENTS

CN    102035855 A    4/2011

OTHER PUBLICATIONS

Holstein, Dennis K., et al., "Cyber Security Management for Utility Operations", *Proceedings of the 39th Annual Hawaii International Conference on System Sciences (HICSS '06)*, (2006), 1-10.

(Continued)

*Primary Examiner* — Edward Zee
(74) *Attorney, Agent, or Firm* — Schwegman Lundberg & Woessner, P.A.

(57) ABSTRACT

A system comprising a computer-readable storage medium storing at least one program, and a method for reducing cyber-security related false positive alerts is presented. In example embodiments the method may include identifying an abnormal operation pattern in the network system that may signal a cyber-security threat. In response to identifying the abnormal operation pattern, data related to a state change of an asset included in the network system is accessed. The method may further include determining that the abnormal operation pattern and the state change of the asset are correlated, and based on this determination, determining that the abnormal operation pattern is a false positive indicator with respect to the cyber-security threat.

20 Claims, 8 Drawing Sheets

(56) References Cited

U.S. PATENT DOCUMENTS

2013/0091539 A1* 4/2013 Khurana ............... G06F 21/552
                                                    726/1
2013/0227697 A1   8/2013 Zandani
2013/0254885 A1*  9/2013 Devost .................. G06F 21/316
                                                    726/23

OTHER PUBLICATIONS

Yu, Jiaxi, et al., "Cyber Security Vulnerability Assessment of Power Industry", *2006 IEEE Region 10 Conference* (*TENCON 2006*), Hong Kong, Nov. 14-17, 2006, (2006), 4 pgs.

* cited by examiner

COLLABORATIVE INFRASTRUCTURE SUPPORTING CYBER-SECURITY ANALYTICS IN INDUSTRIAL NETWORKS

TECHNICAL FIELD

The subject matter disclosed herein relates to data processing. In particular, example embodiments may relate to a collaborative infrastructure to maintain and support cyber-security in industrial network systems.

BACKGROUND

The "Industrial Internet" refers to an integrated networked system of complex physical machinery (referred to as "assets") with embedded sensors and advanced analytic tools configured to communicate with one another. As the Industrial Internet technologies evolve, a greater number of assets (e.g., medical equipment, aviation units, trains, and gas turbines) are integrated into cloud architectures with data collected from the assets' embedded sensors being used by analytic engines for predictive analytics and optimizations. Although the connectivity of these assets brings a number of productivity benefits, it also presents significant challenges in the domain of cyber-security. For example, in a widely connected environment, a "zero-day" cyber-attack that exploit unknown system vulnerabilities can generate malware that quickly spreads through the network thereby creating significant damage. The term "zero-day" stems from the fact that these attacks sometimes take new form, going unnoticed by monitoring entities, thereby allowing no time before support engineers or software developers can distribute a "software patch" that fixes and removes the vulnerability. To this end, there are significant efforts to enhance the cyber security infrastructures of the Industrial Internet to deal with such threats.

For example, cyber-security analytic engines may be specifically designed to detect anomalies in the Industrial internet that are associated with cyber-attacks. These engines monitor network and sensor data, assess their parameters and try to detect unusual behavioral patterns that could signal a "zero-day" attack. However, analytics engines that are based on behavioral patterns often suffer from higher rates of false positives compared to the targeted approach. Since the targeted approach cannot be applied to detect a newly invented "zero-day" attack, cyber-security solutions designed to mitigate this risk must resort to some behavioral analysis and hence are prone to a higher rate of false positive alerts. These false positives will potentially trigger misleading alerts through the monitoring system, thereby leading to a series of unnecessary and even disruptive automated or human operated action items.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure relate to a collaborative infrastructure for exchanging and analyzing data related to operations of an industrial network system (those skilled in the art may also refer to this as "the industrial internet"), which is a network of integrated physical machinery (herein referred to as "assets") in an industrial environment that are communicatively coupled using sensors and software. Example embodiments may involve the detection of anomalies (e.g., abnormal operational behavior) by a cyber-security analytics engine that may signal a cyber-security risk (e.g., "zero-day attack") in the industrial network system.

However, there are a significant number of scenarios during the lifecycle of an industrial network system in which detected anomalies are in fact rare events of system re-configuration (e.g., a new asset being added or removed, components being replaced, or additional sensors being installed) or inevitable malfunctions in the assets themselves, the sensors that monitor them, or the network that connects them. Some of these malfunctions may be rare, but nevertheless, may be detected by specialized sensors or by components equipped with operational aware software. Furthermore, there are asset analytics engines that have significant domain knowledge on the nature of the asset and so they are well equipped to monitor and detect anomalies in the data they collect from the asset's sensors.

For example, analytics components used in the aviation industry are equipped with deep knowledge expertise on what a normal aircraft engine behavior is (e.g., typical temperatures profiles for certain engine versions for the duration of liftoff, cruise or landing). These analytics engines are also programmed for the obvious correlation between parameters such as flight altitude or geographical location and the behavior of the engine. In a scenario where aircraft parameters might appear as an anomaly to a cyber-security analytics engine that is based solely on behavioral patterns, an aviation asset analytics engine will have more insight into the behavior. Sharing of this information with the cyber-security analytics engine can avoid unnecessary false positive alerts. Thus, a collaborative infrastructure that provides a mechanism for these devices (e.g., sensors, asset analytics engines, cyber-security engines) to communicate, as described herein, may have the technical effect of increasing the accuracy of cyber-security alerts generated in industrial network systems.

Example embodiments may include a method for reducing cyber-security false positive alerts in an industrial network system. These alerts, which are generated based on operational anomalies detected in the industrial network system, may be false positives in the sense that they indicate that a cyber-security threat is present when no actual cyber-security threat is present. Consistent with some embodiments, the method may include identifying an operational anomaly (e.g., unusual operational behavior) in an industrial network system, and accessing data about the state of assets involved in the anomaly. The method may further include identifying a state change (e.g., a reconfiguration or malfunction) in the assets, and determining that the state change is correlated with the anomaly. Based on the correlation of the state change and the anomaly, the method may determine that the anomaly is a false positive with respect to indicating a cyber-security threat.

Figure 1:
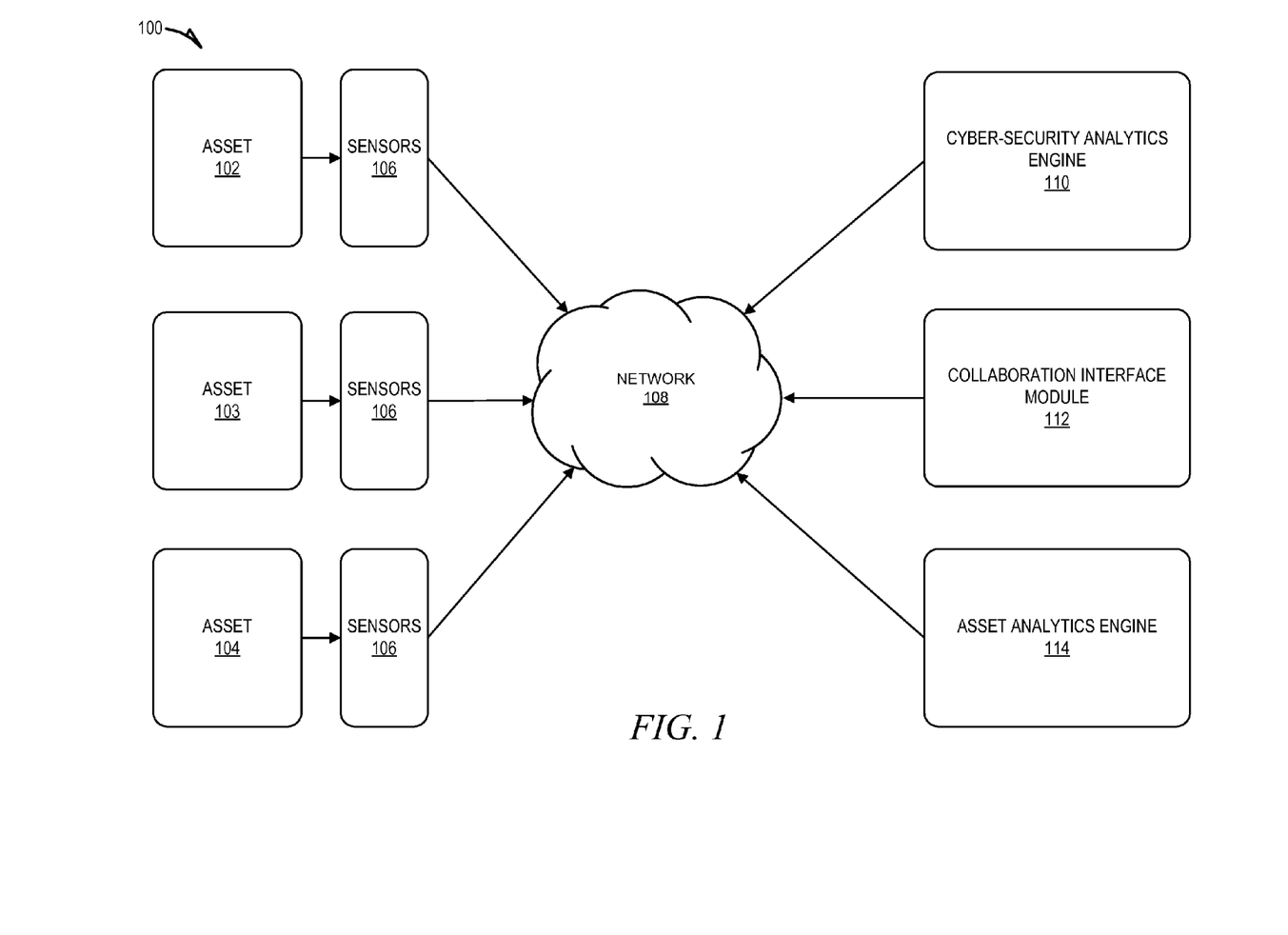
FIG. 1 is an architecture diagram depicting an industrial network system having a collaborative infrastructure for exchanging and analyzing data, according to an example embodiment.

FIG. 1 is an architecture diagram depicting an industrial network system 100 having a collaborative infrastructure for exchanging and analyzing data, according to an example embodiment. As is understood by skilled artisans in the relevant computer and Internet-related arts, the modules and engines illustrated in FIG. 1 represent a set of executable software instructions and the corresponding hardware (e.g., memory and processor) for executing the instructions. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the industrial network system 100 to facilitate additional functionality that is not specifically described herein. Furthermore, the various functional modules and engines depicted in FIG. 1 may reside on a single computer (e.g., a server), or may be distributed across several computers in various arrangements such as cloud-based architectures.

The industrial network system 100 is a network of integrated assets 102-104 (e.g., physical machinery) with embedded sensors 106 in an industrial environment that are configured to exchange data over the network 108 using advanced controls and software applications. Each of the assets 102-104 may be responsible for performing one or more functions within the industrial environment, and the operation of these interconnected assets 102-104 within the industrial network system 100 may be coordinated to achieve operational efficiencies. The assets 102-104 may, for example, include medical equipment, aviation units, trains, vehicles, gas turbines or the like. In some embodiments, at least some of the assets 102-104 may be or include operationally aware components that are equipped with software (e.g., network or cloud-management software tools) or other intelligence to analyze and obtain domain information relating to the parameters of the asset 102-104 as well as the industrial network system 100.

The sensors 106 collect data relating to various parameters of the on-going operations of the assets 102-104. The data exchanged over the network 108 may include, but is not limited to, the data collected by the sensors 106, analytic data, optimization models, network data, domain data, malfunction reports, and cyber-security alerts among others. In some embodiments, the network 108 may include one or more wireless access points coupled to a local area network (LAN), a WAN, the Internet, or other packet-switched data network. In some embodiments, the network 108 may be a LAN, a WAN, the Internet, or other packet-switched data network. Accordingly, a variety of different configurations are expressly contemplated.

As illustrated in FIG. 1, the industrial network system 100 also includes a cyber-security analytics engine 110. The cyber-security analytics engine 110 is a network component specifically designed to detect unusual operational patterns in the industrial network system 100 that are associated with cyber-attacks. To this end, the cyber-security analytics engine 110 monitors network and sensor data of assets 102-104 included in the industrial network system 100, and assesses their parameters to determine a usual pattern of operation in the industrial network system 100. The cyber-security analytics engine 110 may continue to monitor the industrial network system 100 to detect anomalies (e.g., unusual operational patterns) in the operation of the industrial network system 100.

A collaboration interface module 112 supports the cyber-security analytics engine 110 by providing interfaces to exchange detailed domain information regarding the network 108 and asset configurations of relevant portions of the industrial network system 100. For example, the collaboration interface module 112 may provide an interface to allow the cyber-security analytics engine 110 to exchange information with one or more asset analytics engines 114. The asset analytics engine 114 is configured to provide predictive analytics and optimizations of the assets 102-104 in the industrial network system 100. The asset analytics engine 114 may monitor and analyze the status and configuration of parameters of the industrial network system 100 to obtain asset domain data. The asset analytics engine 114 may also detect malfunctions in the assets 102-104 and sensors 106, and issue reports identifying such malfunctions.

In some instances, the asset analytics engine 114 may be developed to fit the needs of a particular industrial segment, and in many instances, the asset analytics engine 114 may have access to data that the cyber-security analytics engine 110 does not. For example, an aviation asset analytics engine 114 may have knowledge on an engine type (e.g., GE90, GE CF34, etc.), as well as additional information on configuration of the subcomponents.

At the time of any network reconfiguration event, the sensors 106, asset analytics engine 114, and other operationally aware components (e.g., components equipped with network or cloud management tools) in the industrial network system 100 may pass information about these changes through the collaboration interface module 112. In turn, the collaboration interface module 112 may analyze this information to correlate potential anomalies detected by the cyber-security analytics engine 110 with changes in the network 108 that are rationalized anomalies. In this manner, the collaboration interface module 112 assists the cyber-security analytics engine 110 in minimizing or at least reducing the number of cyber-security threat related false positives.

The collaboration interface module 112 may also provide a number of interfaces to notify subscribed listeners (e.g., the cyber-security analytics engine 110) on the state of the assets 102-104. These interfaces may further allow the cyber-security analytics engine 110 or other subscribed components or entities to query (e.g., the asset analytics engine 114) for the state of the assets 102-104. For example, in instances in which the cyber-security analytics engine 110 detects an operational anomaly that signals a potential cyber-security threat, the cyber-security analytics engine 110 may utilize the collaboration interface module 112 to query the asset analytics engine 114 for additional information before issuing a cyber-security alert. In this way, the cyber-security analytics engine 110 may correlate a detected operational anomaly with decisions backed up by the domain knowledge of the asset analytics engine 114. In some instances, the cyber-security analytics engine 110 may avoid issuing a cyber-security alert if a detected operational anomaly is well correlated (e.g., time-correlated) with a well understood change in an asset (e.g., asset 102-104) reported by the asset analytics engine 114. In these instances, the collaboration interface module 112 may record information related to the correlation between the anomaly and the asset change so as to enable the cyber-security analytics engine 110 to adapt future analysis and learn from these incidents.

The collaboration interface module 112 may also provide the cyber-security analytics engine 110 with a detailed set of information generated by the asset analytics engine 114 that relates to certain decision making processes involving machine learning algorithms. This information may include relevant parameters and their respective states and associations as well as decision rules and models that are used by the asset analytics engine 114. For example, in embodiments in which the asset analytics engine 114 corresponds to a locomotive analytics engine, the collaboration interface module 112 may obtain and provision (e.g., to the cyber-security analytics engine 110) information relating to the state of the locomotive (e.g., the asset 102-104) as well as a specific configuration of asset parameters that triggered the state of the locomotive. In the locomotive example, these parameters may include speed, gear, pressure, temperature, oil pressure, or the like.

The collaboration interface module 112 may also be operable to overrule decisions of the asset analytics engine 114 and provide a notification to the cyber-security analytics engine 110 that the cause of an apparent asset malfunction is in fact a cyber-attack. In some embodiments, the collaboration interface module 112 may directly overrule these decisions, while in other embodiments; the collaboration interface module 112 simply provides information to the cyber-security analytics engine 110 that causes the cyber-security analytics engine 110 to overrule the decisions of the asset analytics engine 114.

While the collaboration interface module 112 is shown in FIG. 1 to form part of a service that is separate and distinct from the cyber-security analytics engine 110, it will be appreciated that, in alternative embodiments, the collaboration interface module 112 may be embedded or otherwise included as part of the cyber-security analytics engine 110. Further, while FIG. 1 provides an example architecture that is consistent with some embodiments, the presented inventive subject matter is not limited to the architecture illustrated in FIG. 1, and may equally well find application in a client-server architecture, an event-driven, distributed, or peer-to-peer architecture system, for example. It shall also be appreciated that although various components of the industrial network system 100 are discussed in the singular sense, multiple instances of one or more of the various functional components may be employed. Similarly, although the industrial network system 100 illustrated in FIG. 1 includes only assets 102-104, in alternative embodiments, the industrial network system 100 may include fewer or additional assets.

Figure 2:
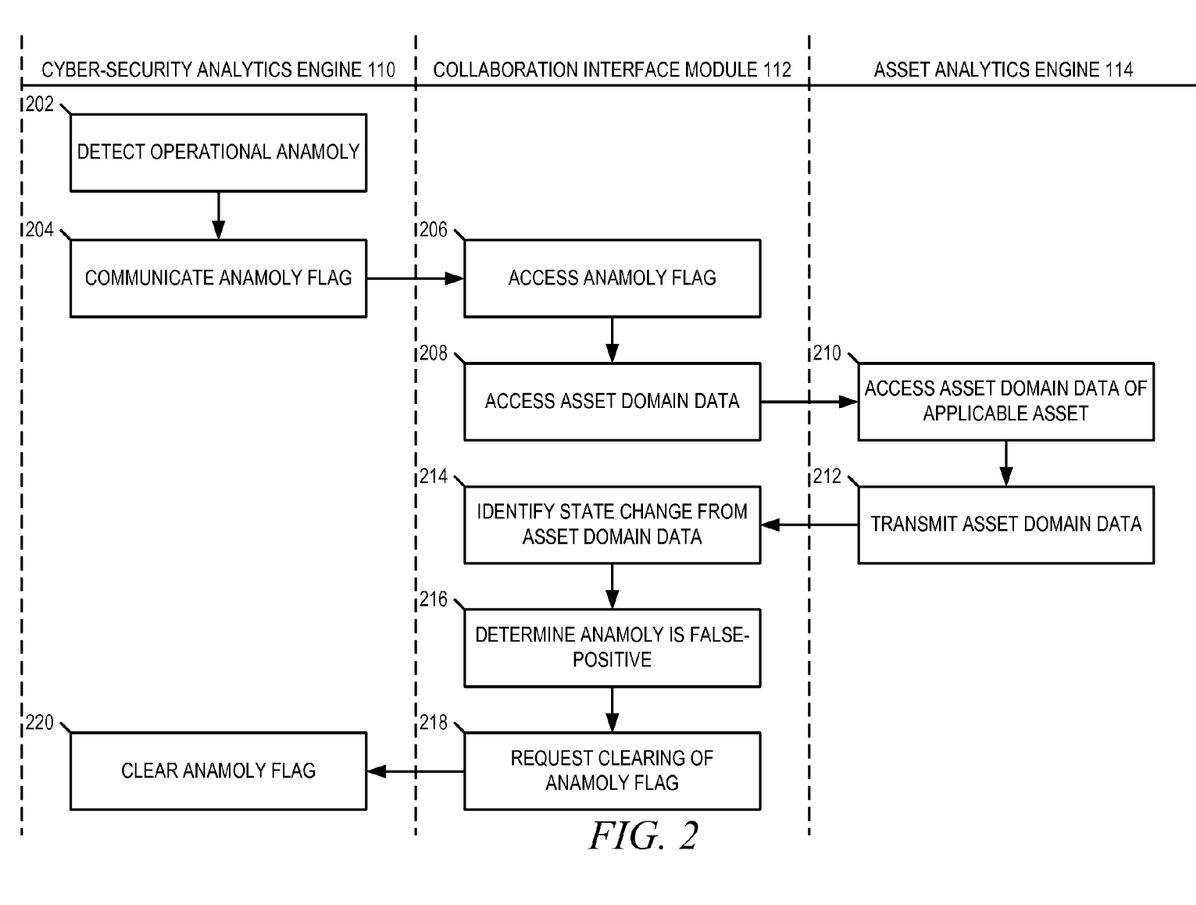
FIG. 2 is an interaction diagram depicting example exchanges between a cyber-security analytics engine, a collaboration interface module, and an asset analytics engine, consistent with some embodiments.

FIG. 2 is an interaction diagram depicting example exchanges between a cyber-security analytics engine 110, a collaboration interface module 112, and an asset analytics engine 114, consistent with some embodiments. As shown, the process begins at operation 202 with the cyber-security analytics engine 110 detecting an operational anomaly that signals a potential cyber-security threat to the industrial network system 100. The detecting of the anomaly may be based on one or more of the assets 102-104 comprising the industrial network system 100, either individually or in conjunction, operating in a manner that is inconsistent with the normal operational pattern observed in the industrial network system 100. At operation 204, the cyber-security analytics engine 110 may update an anomaly flag (e.g., a code embedded in data that signals the existence of an operational anomaly), which is communicated to the collaboration interface module 112 at operation 204. The anomaly flag signals the detection of an anomaly and may specify a time in which the anomaly occurred and the assets involved in the anomaly. In some embodiments, the cyber-security analytics engine 110 and collaboration interface module 112 may be configured to communicate data according to a publisher-subscriber pattern whereby the collaboration interface module 112 may subscribe to data relating to anomaly flags, which is published and produced by the cyber-security analytics engine 110 based on the detection of the anomaly.

At operation 206, the collaboration interface module 112 may access the anomaly flag. At operation 208, the collaboration interface module 112 may access asset domain data from the asset analytics engine 114 in response to the anomaly flag. The asset domain data may include information related to various states (e.g., current and historical) of assets involved in the anomaly, and the configuration of the respective parameters of each these assets.

At operation 210, the asset analytics engine 114 may access the requested asset domain data. The asset domain data may be information collected and stored by the asset analytics engine 114 from the sensors 106 and other domain-aware components embedded in the assets 102-104. At operation 212, the asset analytics engine 114 may communicate the asset domain data to the collaboration interface module 112.

At operation 214, the collaboration interface module 112 may identify a state change in one or more of the assets 102-104 from the asset domain data. The state change may, for example, be due to user initiated changes in the industrial network system 100. At operation 216, the collaboration interface module 112 may determine an anomaly is a false positive with respect to the cyber-security threat based on the state change being time correlated with the anomaly. In response to determining that the anomaly is a false positive, the collaboration interface module 112 requests that the cyber-security analytics engine 110 clears the anomaly flag, at operation 218. At operation 220, the cyber-security analytics engine 110 clears the anomaly flag in response to the request from the collaboration interface module 112. In instances in which the collaboration interface module 112 does not determine the anomaly is a false positive, the anomaly flag will not be cleared, and the cyber-security analytics engine 110 may issue an anomaly alert to network administrators to indicate a potential cyber-security threat (e.g., a cyber-attack).

Figure 3:
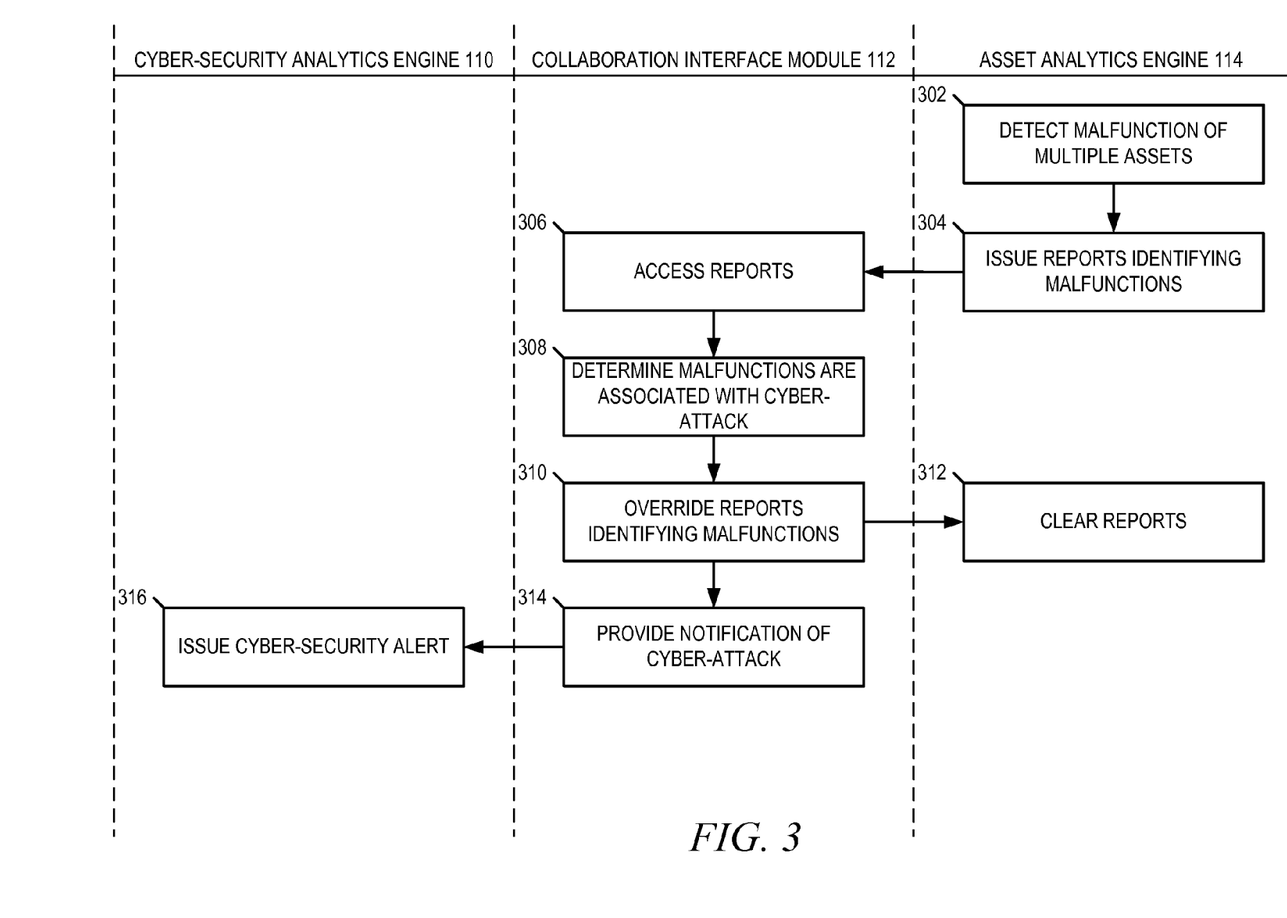
FIG. 3 is an interaction diagram depicting additional example exchanges between the cyber-security analytics engine, the collaboration interface module, and the asset analytics engine, consistent with some embodiments.

FIG. 3 is an interaction diagram depicting additional example exchanges between the cyber-security analytics engine 110, the collaboration interface module 112, and the asset analytics engine 114, consistent with some embodiments. As shown, the process begins at operation 302 at which point the asset analytics engine 114 may detect malfunctions in multiple assets (e.g., assets 102-104) of the industrial network system 100. At operation 304, the asset analytics engine 114 issues reports identifying the detected malfunctions. In addition, the reports may specify particular components involved in the malfunction, their respective configurations, and the times in which the malfunctions occurred.

At operation 306, the collaboration interface module 112 accesses the reports identifying the malfunctions of the multiple assets 102-104. At operation 308, the collaboration interface module 112 may determine that the malfunctions are associated with a cyber-attack. For example, the collaboration interface module 112 may determine that the malfunctions are associated with a cyber-attack based on the malfunctions of the multiple assets being identical or of the same nature, and occurring at substantially the same time. Based on determining that the malfunctions are associated with a cyber-attack, the collaboration interface module 112 may override the reports identifying the malfunctions of the multiple assets, at operation 310. In turn, the asset analytics engine 114 clears the reports at operation 312.

At operation 314, the collaboration interface module 112 provides a notification of the cyber-attack to the cyber-security analytics engine 110. In turn, the cyber-security analytics engine 110 issues a cyber-security alert identifying the cyber-attack at operation 316. The cyber-security analytics engine 110 may provide the cyber-security alert to administrators of the industrial network system 100 or any other entity subscribed to the services of the cyber-security analytics engine 110.

Figure 4:
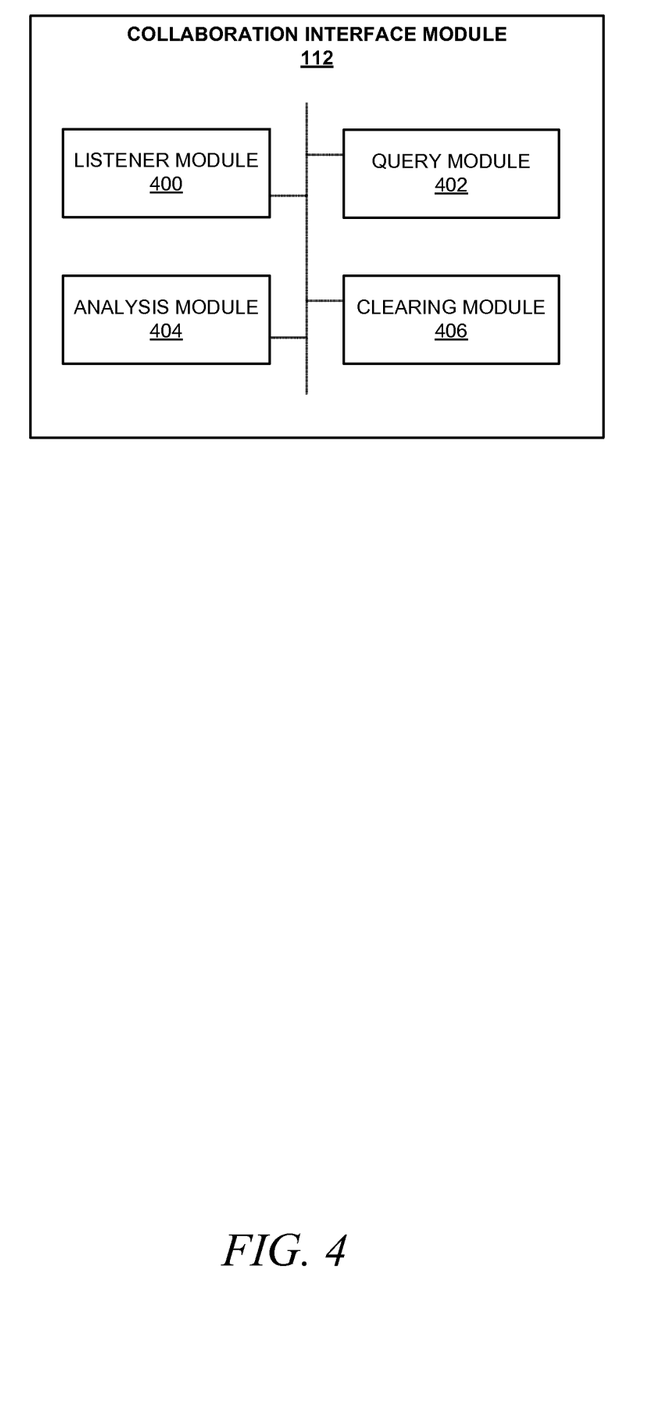
FIG. 4 is a block diagram illustrating various modules comprising a collaboration interface module, which is provided as part of the industrial network system, consistent with some embodiments.

FIG. 4 is a block diagram illustrating various modules comprising a collaboration interface module 112, which is provided as part of the industrial network system 100, consistent with some embodiments. In some embodiments, the modules illustrated in FIG. 4 represent a set of executable software instructions and the corresponding hardware (e.g., memory and processor) for executing the instructions. Further, it shall be appreciated that while the modules of FIG. 4 are discussed in the singular sense, in other embodiments multiple instances of one or more of the modules may be employed.

The collaboration interface module 112 is shown as including a listener module 400, an query module 402, an analysis module 404, and a clearing module 406, all configured to communicate with each other (e.g., via a bus, shared memory, a switch, or application programming interfaces (APIs)). The aforementioned modules of the collaboration interface module 112 may, furthermore, access one or more databases that are part of the industrial network system 100, and each of the modules may be capable of communication with the other components of the industrial network system 100 (e.g., assets 102-104, cyber-security analytics engine 110, and asset analytics engine 114).

The listener module 400 may be configured to access various data produced by components of the industrial network system 100. For example, the listener module 400 may access information produced by the cyber-security analytics engine 110 relating to cyber-security threats and attacks to the industrial network system 100. This information may identify potential cyber-security threats or attacks, the timing of such attacks or threats, and the assets or components involved in or affected by the threat or attack. Other examples of data accessed by the listener module 400 may include reports or alerts provided by the asset analytics engine 114 relating to the malfunction of assets or other components of the industrial network system 100.

The query module 402 may be configured to query components of the industrial network system 100 for information. These queries may be in response to a request for such from another component, or in response to an event occurring in the industrial network system 100. For example, in response to the cyber-security analytics engine 110 detecting an operational anomaly in the industrial network system 100, the query module 402 may query the asset analytics engine 114 or an operationally aware component for domain data including information about the nature of an asset or set of assets (e.g., involved in the operational anomaly) such as asset state and configuration of asset parameters.

The analysis module 404 may be configured to analyze various data related to the operation of the industrial network system 100 to make determinations regarding cyber-security issues. For example, the analysis module 404 may analyze asset domain data obtained from the asset analytics engine 114 to identify changes in an asset state such as a reconfiguration of asset parameters. The analysis module 404 may further identify a correlation between the change in state and an anomaly detected by the cyber-security analytics engine 110. Upon determining that the change in state and anomaly are correlated, the analysis module 404 may determine that the detected anomaly is a false positive with respect to a potential cyber-security threat.

The clearing module 406 may be configured to signal the cyber-security analytics engine 110 to clear an anomaly flag in response to a determination that a corresponding anomaly is a false positive. The clearing module 406 may also be configured to signal the asset analytics engine 114 to clear reports of asset malfunction based on a determination that the malfunctions are associated with a cyber-attack.

Figure 5:
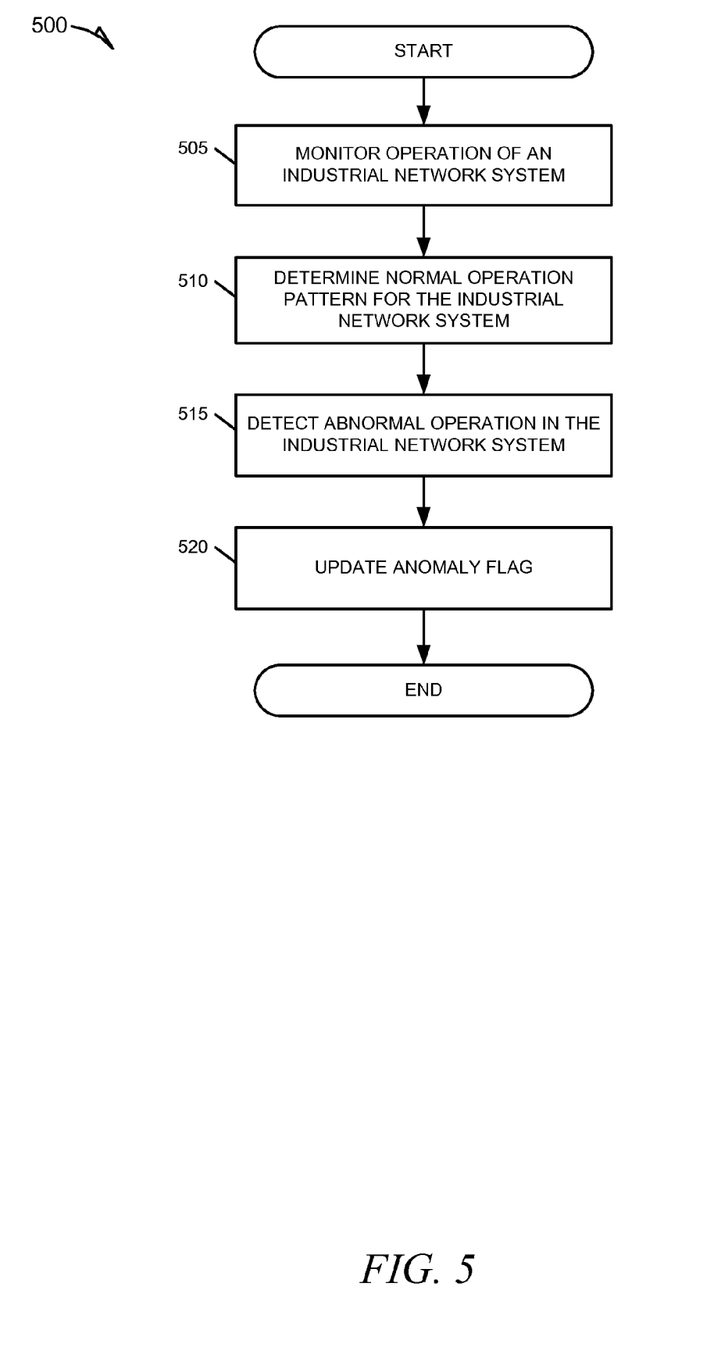
FIG. 5 is a flowchart illustrating a method for detecting an operational anomaly in an industrial network system, consistent with some embodiments.

FIG. 5 is a flowchart illustrating a method for detecting an operational anomaly in an industrial network system 100, consistent with some embodiments. The method 500 may be embodied in computer-readable instructions for execution by one or more processors such that the steps of the method 500 may be performed in part or in whole by the components of the cyber-security analytics engine 110, and accordingly, the method 500 is described below by way of example with reference thereto. However, it shall be appreciated that the method 500 may be deployed on various other hardware configurations and is not intended to be limited to the cyber-security analytics engine 110.

At operation 505, the cyber-security analytics engine 110 monitors operation of the industrial network system 100. The monitoring of the operation of the industrial network system 100 by the cyber-security analytics engine 110 may include monitoring network data (e.g., intercept and log traffic passing over the industrial network system 100), and data received from asset sensors (e.g., sensors 106). At operation 510, the cyber-security analytics engine 110 determines a normal operation pattern of the industrial network system 100 based on the monitoring. The normal operation pattern may include the various attributes and parameters of the industrial network system 100 and each of its components during normal operation.

At operation 515, the cyber-security analytics engine 110, while continuing to monitor the industrial network system 100, detects an abnormal operation in the industrial network system 100. The detecting of the abnormal operation of the industrial network system 100 may comprises determining that one or more parameters or attributes of the industrial network system 100 is inconsistent or otherwise not in accordance with the normal operation pattern determined at operation 510. Based on detecting the abnormal operation in the industrial network system 100, the cyber-security analytics engine 110 updates an anomaly flag at operation 520 to signify an abnormal operation in the industrial network system 100, which may signal a cyber-attack or other cyber-security threat.

Figure 6:
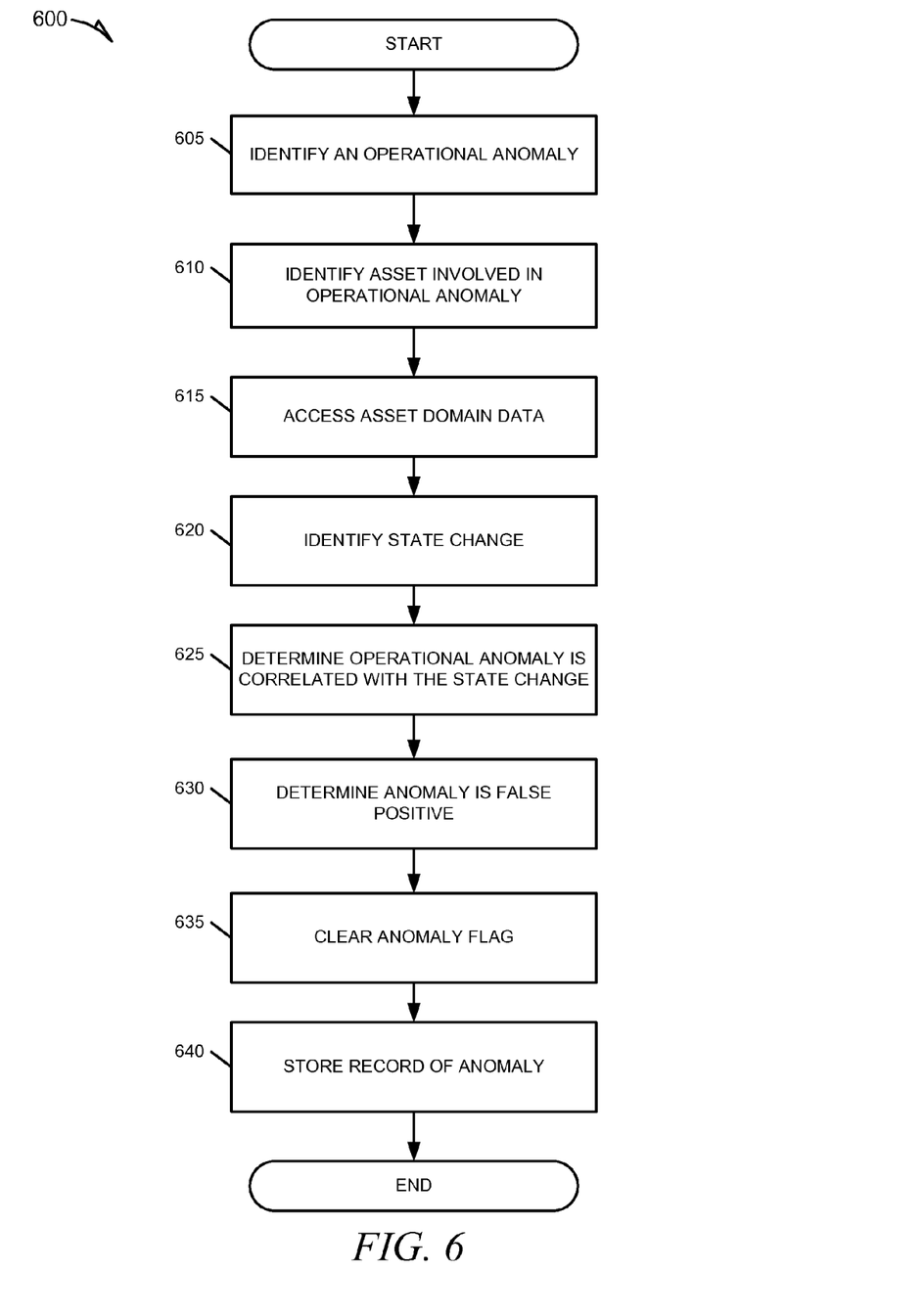
FIG. 6 is a flowchart illustrating a method for reducing false positive alerts in an industrial network system, consistent with some embodiments.

FIG. 6 is a flowchart illustrating a method 600 for reducing false positive alerts in an industrial network system 100, consistent with some embodiments. The method 600 may be embodied in computer-readable instructions for execution by one or more processors such that the steps of the method 600 may be performed in part or in whole by the components of collaboration interface module 112, and accordingly, the method 600 is described below by way of example with reference thereto. However, it shall be appreciated that the method 600 may be deployed on various other hardware configurations and is not intended to be limited to the collaboration interface module 112.

At operation 605, the listener module 400 may identify an operational anomaly in the industrial network system 100. The operational anomaly may signal a potential cyber-security related threat to the industrial network system 100. The identifying of the operational anomaly may be based on one or more anomaly flags maintained by the cyber-security analytics engine 110 indicating that an abnormal operation pattern has been detected in the industrial network system 100.

At operation 610, the analysis module 404 may identify an asset (e.g., assets 102-104) involved in the operational anomaly (e.g., based on information provided by the cyber-security analytics engine 110). At operation 615, the query module 402 may access asset domain data for the asset from the asset analytics engine 114. The asset domain data includes historical and current information about the nature of the asset such as a state of the asset and configuration of asset parameters. In embodiments in which the identified asset is equipped with operationally aware software (e.g., network or cloud management tools), the asset domain data may be obtained directly identified asset.

At operation 620, the analysis module 404 analyzes the asset domain data to identify a state change in the asset 102-104. For example, the state change in the asset may be based on a system reconfiguration event such as a new asset being added or removed from the industrial network system 100, asset components being replaced, or additional sensors being installed. As another example, the state change in the asset may be based on a malfunction in the asset, in a sensor that monitors the asset, or a malfunction in the network 108.

At operation 625, the analysis module 404 determines that the operational anomaly is correlated with the state change. For example, the analysis module 404 may determine that the operational anomaly and the state change are time-correlated (e.g., both occurring within a predetermined time period). The determination that the operational anomaly and the state change are time correlated may include comparing the respective timing of the operational anomaly and the state change (e.g., based on information included in the anomaly flag and the asset domain data), and determining that the operational anomaly and the state change both occurred within a certain time period (e.g., within 30 seconds of one another). Based on the determination that the operational anomaly and the state change are correlated, the analysis module 404 determines that the operational anomaly is a false positive with respect to signaling a potential cyber-security threat, at operation 630. Stated differently, at operation 630, the analysis module 404 determines that the operation anomaly does not indicate a potential cyber-security threat.

At operation 635, the clearing module 406 clears an anomaly flag associated with the operational anomaly identified at operation 605. In some embodiments, the clearing module 406 may directly clear the anomaly flag, while in other embodiments the clearing module 406 may signal the cyber-security analytics engine 110 to clear the anomaly flag. At operation 640, the clearing module 406 may store a record of the operational anomaly, the state change, and an indicator of the false positive so as to provide the collaboration interface module 112 the ability to learn from the from the false positive, and avoid similar false positive alerts in future situations with similar parameters.

Figure 7:
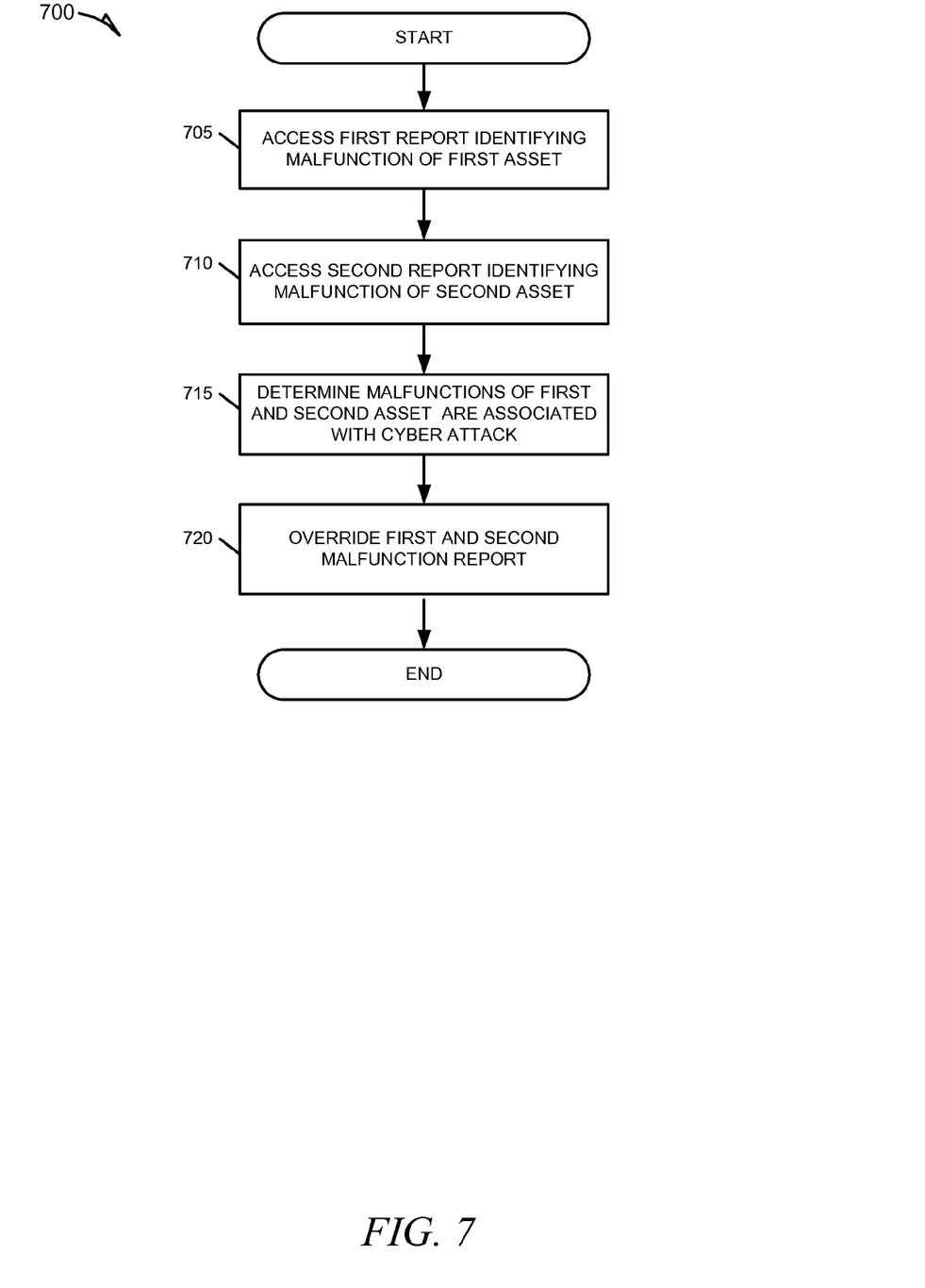
FIG. 7 is a flowchart illustrating a method for overriding malfunction reports provided by the asset analytics engine, consistent with some embodiments.

FIG. 7 is a flowchart illustrating a method 700 for overriding malfunction reports provided by the asset analytics engine 114, consistent with some embodiments. The method 700 may be embodied in computer-readable instructions for execution by one or more processors such that the steps of the method 700 may be performed in part or in whole by the components of collaboration interface module 112, and accordingly, the method 500 is described below by way of example with reference thereto. However, it shall be appreciated that the method 700 may be deployed on various other hardware configurations and is not intended to be limited to the collaboration interface module 112.

At operation 705, the listener module 400 may access a first report identifying a malfunction of a first asset 102-104 in the industrial network system 100. At operation 710, the listener module 400 may access a second report identifying a malfunction of a second asset in the industrial network system 100. The first and second reports may be generated by one or more asset analytics engines (e.g., asset analytics engine 114) responsible for monitoring and assessing the parameters of the first and second assets, respectively or in conjunction. The reports may identify the assets, and provide details regarding the malfunction (e.g., timing and specific components involved in the malfunction).

At operation 715, the collaboration interface module 112 in conjunction with the cyber-security analytics engine 110 determines that the malfunctions of the first and second assets are associated with a cyber-attack. For example, based on information received from the asset analytics engine 114, the collaboration interface module 112 may determine that the reported malfunction of the first and second asset is the exact same malfunction of the same nature. Based on the unlikeliness, and in some instances impossibility, of such concurrent malfunctions, the collaboration interface module 112 may determine that the malfunction is in fact a cyber-attack.

At operation 720, the collaboration interface module 112 may override the first and second reports based on determining that the reported malfunctions are instead an associated cyber-attack. In some instances, upon determining that the concurrent malfunctions are associated with a cyber-attack, the cyber-security analytics engine 110 may provide a cyber-security alert to an administrator of the industrial network system 100 to signal the potential cyber-attack.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture and Machine-Readable Medium

Figure 8:
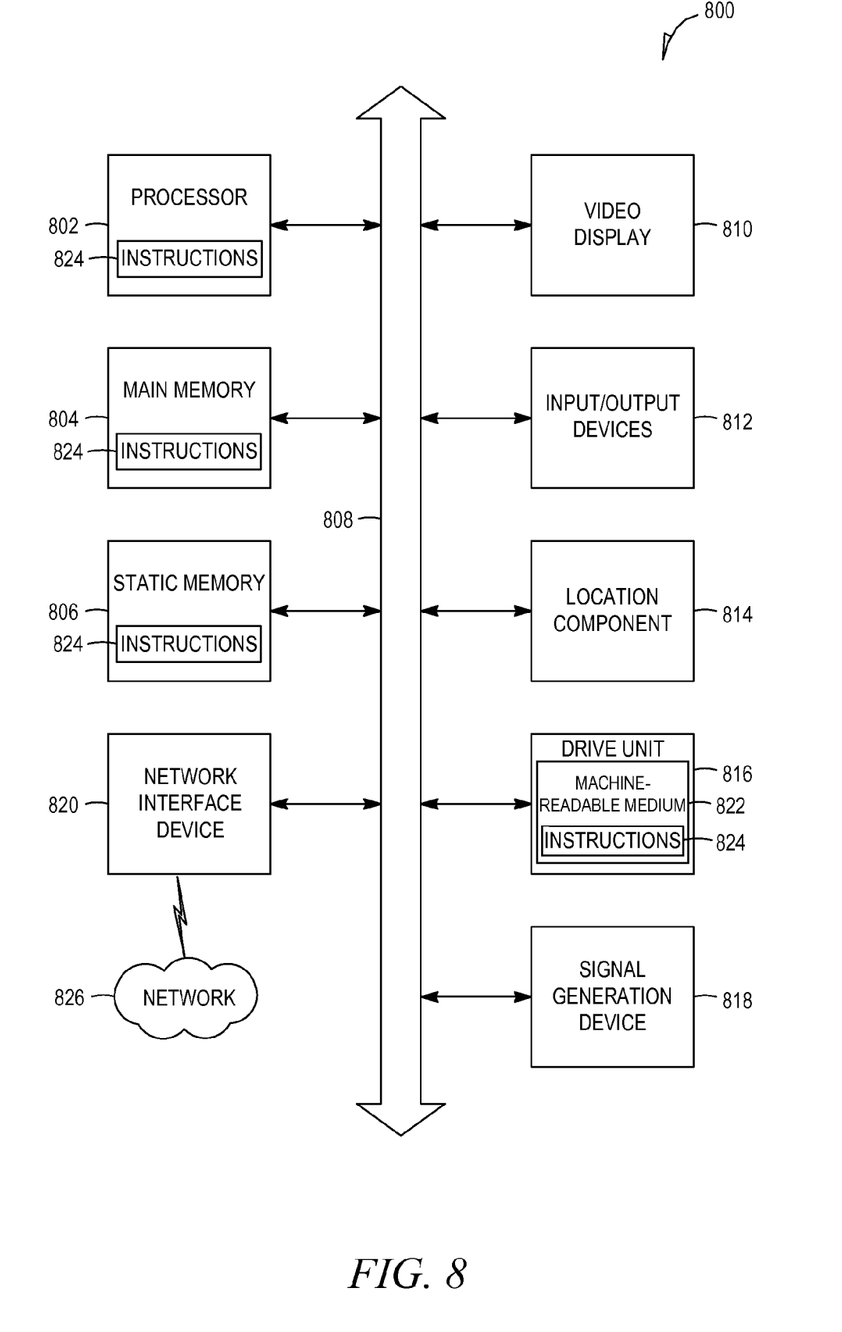
FIG. 8 is a diagrammatic representation of a machine in the example form of a computer system within which a set of instructions for causing the machine to perform any one or more of the methodologies discussed herein may be executed.

FIG. 8 is a diagrammatic representation of a machine in the example form of a computer system 800 within which a set of instructions for causing the machine to perform any one or more of the methodologies discussed herein may be executed. The computer system 800 may correspond to any of the cyber-security analytics engine 110, the collaboration interface module 112, or the asset analytics engine 114, consistent with some embodiments. The computer system 800 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display 810 (e.g., a liquid crystal display (LCD) or a cathode ray tube (CRT)). The computer system 800 also includes one or more input/output (I/O) devices 812, a location component 814, a drive unit 816, a signal generation device 818 (e.g., a speaker), and a network interface device 820. The I/O devices 812 may, for example, include a keyboard, a mouse, a keypad, a multi-touch surface (e.g., a touchscreen or track pad), a microphone, a camera, and the like.

The location component 814 may be used for determining a location of the computer system 800. In some embodiments, the location component 814 may correspond to a GPS transceiver that may make use of the network interface device 820 to communicate GPS signals with a GPS satellite. The location component 814 may also be configured to determine a location of the computer system 800 by using an internet protocol (IP) address lookup or by triangulating a position based on nearby mobile communications towers. The location component 814 may be further configured to store a user-defined location in main memory 804 or static memory 806. In some embodiments, a mobile location enabled application may work in conjunction with the location component 814 and the network interface device 820 to transmit the location of the computer system 800 to an application server or third party server for the purpose of identifying the location of a user operating the computer system 800.

In some embodiments, the network interface device 820 may correspond to a transceiver and antenna. The transceiver may be configured to both transmit and receive cellular network signals, wireless data signals, or other types of signals via the antenna, depending on the nature of the computer system 800.

Machine-Readable Medium

The drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, the static memory 806, and/or the processor 802 during execution thereof by the computer system 800, with the main memory 804, the static memory 806, and the processor 802 also constituting machine-readable media 822.

Consistent with some embodiments, the instructions 824 may relate to the operations of an operating system (OS). Depending on the particular type of the computer system 800, the OS may, for example, be the iOS® operating system, the Android® operating system, a BlackBerry® operating system, the Microsoft® Windows® Phone operating system, Symbian® OS, or webOS®. Further, the instructions 824 may relate to operations performed by applications (commonly known as "apps"), consistent with some embodiments. One example of such an application is a mobile browser application that displays content, such as a web page or a user interface using a browser.

While the machine-readable medium 822 is shown in an example embodiment to be a single medium, the term "machine-readable medium" may include a single medium or multiple media (e.g., a centralized or distributed database, and/or associated caches and servers) that store the one or more data structures or instructions 824. The term "machine-readable medium" shall also be taken to include any tangible medium that is capable of storing, encoding, or carrying instructions (e.g., instructions 824) for execution by the machine and that cause the machine to perform any one or more of the methodologies of the present disclosure, or that is capable of storing, encoding or carrying data structures used by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium 822 is non-transitory in that it does not embody a propagating signal. However, labeling the tangible machine-readable medium 822 "non-transitory" should not be construed to mean that the medium is incapable of movement—the medium should be considered as being transportable from one real-world location to another. Additionally, since the machine-readable medium 822 is tangible, the medium may be considered to be a machine-readable device.

Transmission Medium

The instructions 824 may further be transmitted or received over a network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 824 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    identifying an operational anomaly in a network system by accessing an anomaly flag that indicates a potential cyber-security threat based on detection of the operational anomaly by a cyber-security analytics engine, the network system comprising a plurality of assets, the operational anomaly involving an operation pattern that is inconsistent with a normal operation pattern observed in the network system;
    in response to identifying the operational anomaly, accessing asset domain data of an asset from the plurality of assets, the asset domain data including state information related to the asset and a specific configuration of asset parameters associated with the state information;
    identifying, using the asset domain data, a state change of the asset resulting from a reconfiguration event involving the asset;
    determining, using one or more processors, that the operational anomaly is correlated with the state change resulting from the reconfiguration event involving the asset;
    determining that the operational anomaly is a false positive with respect to the potential cyber-security threat based on the operational anomaly being correlated with the state change of the asset resulting from the reconfiguration event involving the asset;
    causing the anomaly flag to be cleared in response to determining that the anomaly is a false positive based on determining the operational anomaly is correlated with the state change of the asset; and
    storing a record comprising the operational anomaly, the state change, and an indication of the operational anomaly being a false positive.

2. The method of claim 1, wherein the anomaly flag is updated by the cyber-security analytics engine in response to detecting the operational anomaly.

3. The method of claim 2, wherein the causing of the anomaly flag to be cleared comprises transmitting a request to the cyber-security analytics engine to clear the anomaly flag.

4. The method of claim 2, wherein the detecting of the operational anomaly comprises:
    monitoring operation of the network system;
    determining the normal operation pattern of the network system; and
    detecting the operation pattern that is inconsistent with the normal operation pattern of the network system.

5. The method of claim 1, wherein causing the anomaly flag to be cleared comprising transmitting a signal to the cyber security engine to clear the anomaly flag.

6. The method of claim 1, wherein the asset domain data is accessed from an asset analytics engine configured to monitor a status and parameter configuration of the asset.

7. The method of claim 1, wherein the determining that the state change of the asset and the operational anomaly are correlated includes determining that the state change of the asset and the operational anomaly are time-correlated.

8. The method of claim 6, wherein the determining that the state change of the asset and the operational anomaly are time-correlated is based on the state change of the asset and the operational anomaly occurring within a certain time period.

9. The method of claim 1, wherein the reconfiguration event includes a reconfiguration of the asset parameters.

10. The method of claim 1, wherein the reconfiguration event includes at least one of adding the asset to the network system, removing the asset from the network system, replacing a component of the asset, or adding an additional asset to the network system.

11. The method of claim 1, wherein the asset domain data includes a malfunction of the asset.

12. A system comprising:
a listener module configured to identify an operational anomaly in a network system by accessing an anomaly flag that indicates a potential cyber-security threat based on detection of the operational anomaly by a cyber-security analytics engine, the network system comprising a plurality of assets, the operational anomaly involving an operation pattern that is inconsistent with a normal operation pattern observed in the network system;
a query module configured to access, from an asset analytics engine, domain data of an asset from among the plurality of assets, the asset domain data including state information about the asset and a specific configuration of asset parameters related to the state information;
an analysis module, including a processor of a machine, configured to identify a state change in the asset based on a reconfiguration event involving the asset included in the asset domain data, the analysis module further configured to determine that the operational anomaly is correlated with the state change, the analysis module further configured to determine that the operational anomaly is a false positive with respect to the potential cyber-security threat based on the operational anomaly being correlated with the state change; and
a clearing module configured to cause the anomaly flag to be cleared in response to determining that the anomaly is a false positive based on determining the operational anomaly is correlated with the state change of the asset, the clearing module further configured to store a record comprising the operational anomaly, the state change, and an indication of the operational anomaly being a false positive.

13. The system of claim 12, further comprising the cyber-security analytics engine, the cyber-security analytics engine configured to perform operations comprising:
monitoring operation of the network system;
determining the normal operation pattern of the network system;
detecting the operational anomaly; and
updating the anomaly flag in response to detecting the operational anomaly.

14. The system of claim 13, wherein the clear module is configured to signal the cyber-security engine to clear the anomaly flag.

15. The system of claim 13, wherein the network system is an industrial network system comprising physical assets with embedded sensors.

16. The system of claim 12, wherein the analysis module determines the operational anomaly is correlated with the state change by comparing respective timings of the state change and the operational anomaly.

17. The system of claim 12, wherein the asset is coupled to a plurality of sensors, and wherein the asset analytics engine monitors the plurality of sensors to obtain the asset domain data.

18. The system of claim 12, wherein the reconfiguration event includes a reconfiguration of asset parameters.

19. The system of claim 18, wherein the state change of the asset is related to a malfunction of the asset.

20. A non-transitory machine-readable storage medium embodying instructions that, when executed by at least one processor of a machine, cause the machine to perform operations comprising:
identifying an operational anomaly in a network system by accessing an anomaly flag that signals a potential cyber-security threat based on detection of the operational anomaly by a cyber-security analytics engine, the network system comprising a plurality of assets, the operational anomaly involving an operation pattern that is inconsistent with a normal operation pattern observed in the network system;
identifying an asset from the plurality of assets involved in the operational anomaly;
accessing asset domain data including state information related to the asset, the state information including a specific configuration of asset parameters;
identifying, using the asset domain data, a state change in the asset resulting from a reconfiguration event involving the asset;
determining that the state change of the asset resulting from the reconfiguration event and the operational anomaly are time-correlated based on the asset domain data;
determining that the operational anomaly is a false positive with respect to the potential cyber-security threat based on determining that the operational anomaly is correlated with the state change resulting from the reconfiguration event;
causing the anomaly flag to be cleared in response to determining that the anomaly is a false positive based on determining the operational anomaly is correlated with the state change of the asset; and
storing a record comprising the operational anomaly, the state change, and an indication of the operational anomaly being a false positive.

\* \* \* \* \*